United States Patent

Stöeckel

[11] 4,119,260
[45] Oct. 10, 1978

[54] METHOD OF MAKING AN ELECTRICAL CONTACT ELEMENT

[75] Inventor: Dieter Stöeckel, Birkenfeld, Germany

[73] Assignee: G. Rau, Pforzheim, Germany

[21] Appl. No.: 830,318

[22] Filed: Sep. 2, 1977

[30] Foreign Application Priority Data

Sep. 21, 1976 [DE] Fed. Rep. of Germany ....... 2642339

[51] Int. Cl.² ...................... H01R 13/40; B23K 21/02
[52] U.S. Cl. .................................... 228/111; 29/630 C
[58] Field of Search ............... 228/110, 111; 29/630 C

[56] References Cited

U.S. PATENT DOCUMENTS

| 3,531,852 | 10/1970 | Slemmons et al. | 228/110 |
| 3,733,685 | 5/1973 | Kauppila | 228/110 |
| 3,874,963 | 4/1975 | Barger | 228/110 X |
| 3,926,357 | 12/1975 | Martrisian | 228/110 |
| 4,019,876 | 4/1977 | Stockel et al. | 228/110 X |

FOREIGN PATENT DOCUMENTS 1,564,572  3/1970  Fed. Rep. of Germany .......... 228/110

Primary Examiner—Al Lawrence Smith
Assistant Examiner—K. J. Ramsey
Attorney, Agent, or Firm—Wenderoth, Lind & Ponack

[57] ABSTRACT

The contact element is produced by sonic or ultrasonic welding one or more contact pieces onto a carrier, an intermediate layer in the form of a grinding powder being interposed between the contact piece and the carrier prior to such welding in order to assist in the welding of contact pieces made of material which would otherwise be difficult to weld.

4 Claims, 1 Drawing Figure

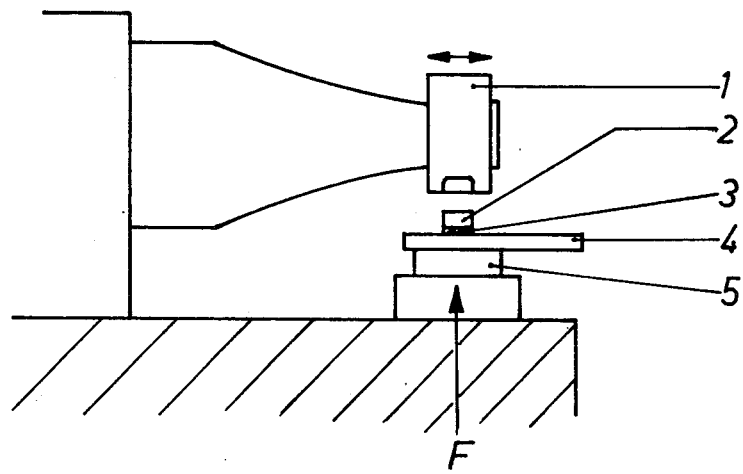

METHOD OF MAKING AN ELECTRICAL CONTACT ELEMENT

The invention relates to an electrical contact element of the type in which at least one contact piece is joined to a carrier by sonic or ultrasonic welding. A method for producing such contact elements is also described.

In order to avoid welding during electrical switching operations of the contact elements, it is desirable that the contact pieces are produced from contact materials which do not weld easily. If such contact elements are used, difficulty can be experienced when joining the contact pieces to the carrier by brazing or welding. This is particularly true of composite materials comprising silver containing non-metallic inclusions, for example, AgCdO, $AgSnO_2$, AgMgO and AgC, that are often used as contact materials. These contact materials contain, embedded in the silver matrix material, non-metallic particles of cadmium oxide, tin oxide or magnesium oxide, for example, and these inclusions may take the form of fibre-like strands lying at right-angles to the eventual contact surface of the contact piece. Although the non-metallic inclusions have the desired effect of offering considerable resistance to welding during the switching operation, they lead to considerable difficulties in the joining of the contact materials when the existing welding or brazing methods are employed.

It is known, for the purpose of securing contact pieces of fusion-resisting material to a carrier to provide the contact piece with a readily weldable or brazable layer on its rear face (i.e. the face which faces the carrier). Intermediate layers of this kind can be produced by various known methods. In the case of internally oxidized material, it is possible to form the weldable or brazable layer by, for example, oxidation on the rear face of the silver layer or by prior cladding of the rear face. Another known possible method involves the production by powder metallurgy of a brazable or weldable intermediate layer by multi-layer pressing or be converting multi-layer ingots to the required size and shape. The production of such contact pieces having a weldable or brazable rear face is very complicated and costly.

It is also known to connect contact materials, having poor welding properties, directly to a carrier by ultrasonic welding. This welding process offers advantages as regards the low thermal loading of the contact material, but in many cases does not result in satisfactory shear strength when the contact pieces and the carrier material are directly joined to each other. Certain favourable combinations of material, e.g. AgCdO and brass, can not be joined together sufficiently firmly by means of existing ultrasonic welding techniques.

One ultrasonic welding method includes a procedure for joining up aluminium electric conductors wherein the contact zones are first covered with a contact foil by ultrasonic spot-welding or ultrasonic roller-welding. A soldered, screw-type or clamp-type connector is then provided at the connection zones thus prepared. Composite foils of copper and aluminium, or gold or silver foils are used as the contact foils. The connection of contact pieces to the carrier, previously clad by means of ultrasonic welding, is difficult and is costly to carry out on a mass-production basis.

The present invention seeks to provide an electrical contact element in which at least contact piece is solidly joined to a carrier by sonic or ultrasonic welding.

In accordance with a first aspect of the invention there is provided an electrical contact element comprising at least one contact piece joined to a carrier by sonic or ultrasonic welding and wherein particles of a grinding powder are embedded between the contact piece and the carrier in the zone of their separating plane.

The grinding powder preferably comprises, at least partially, a metallic component but also a non-metallic component, or mixtures of the two components.

It has been found that contact elements made of materials that are normally difficult to weld, e.g. AgCdO on copper or brass, can be joined by sonic or ultrasonic welding to provide a joint having excellent shear strength if an intermediate layer of a hard powder, essentially possessing good grinding properties, is provided. When the contact piece and the carrier are being jointly shaped by the sonic or ultrasonic welding process, the hard powder particles score the surfaces of the contact piece and the carrier in an uneven manner, so that this roughening of the surfaces to be welded together results in a considerable improvement in the welding operation and in acceleration of cold welding. The powder particles are pressed into both the carrier and the contact piece and to some extent they become distributed above and below the original plane of separation. Investigations have shown however that they do not interfere with the electrical properties and therefore with the functioning of the contact element.

Any significant excess of grinding powder in the intermediate layer should of course be avoided since such excess would give rise to the danger of the scored metal surfaces being held apart by an occluded layer of excess grinding powder, so that cold welding would not be possible.

In accordance with a second aspect of the invention there is provided a method of producing the electrical contact element of the first aspect of this invention, said method comprising placing an intermediate layer of grinding powder between the contact piece and the carrier, and joining the contact piece and the carrier by sonic or ultrasonic welding. Generally it suffices to scatter the grinding powder lightly over one of the surfaces so that a single discontinuous layer having a thickness substantially equal to the size of the individual particles of powder is formed. Preferably the thickness of the intermediate layer is less than $10\mu m$.

Depending upon the nature of the grinding powder used (advantageous results have been achieved with aluminium oxide $Al_2O_3$ and tungsten carbide), it may be expedient to form a loose heap of grinding powder, or to mix the powder with a binder, which may contain a volatile component, and then to apply the material as a paint. It has been found that the above-mentioned joint, using an intermediate layer of grinding powder, can be advantageously formed both by sonic welding, i.e. in a frequency range of approximately 50 Hz to 20 kHz, and by ultrasonic welding above 20 kHz. Where the surfaces to be welded are of larger dimensions, the use of sonic welding appears to be favoured, since with this method higher energy can be made available at the area of weld.

The production of contact elements, using grinding powder, provides excellent results as regards shear strength, and manufacture on a mass-production basis can be carried out economically because of the extreme thinness of the layer of inexpensive grinding powder.

EXAMPLE

A small contact piece in the form of a plate made of AgCdO, in which non-metallic cadmium oxide components were contained in a silver matrix material, had a diameter of 8 mm and a thickness of 1.5 mm. After a powder layer of aluminium oxide ($Al_2O_3$) having a thickness of less than 10µm had been scattered over this plate, it was joined by sonic welding to a carrier in the form of copper strip having a width of 10 mm and a thickness of 2 mm.

The output of the sonic oscillator was 400W and the frequency was 10 kHz. During welding, a compressive force of approximately 1000 N was applied. The welding time was 0.1 sec. The shear strength of the welded joint was found to be approximately 120 n/mm$^2$.

The accompanying drawings is a diagrammatical side elevation of a sonic or ultrasonic welding machine suitable for manufacturing the electrical contact elements of the present invention.

The machine comprises a sonic or ultrasonic oscillator 1 whose main direction of oscillation is indicated by the arrow F. Small contact pieces in the form of plates 2 are first provided with a paint-like coating 3 which contains aluminium oxide in a binder. The mixture is so selected that the total thickness of the coating is below 10 µm. Thereafter, the contact pieces 2 are joined to a copper carrier strip 4 by sonic or ultrasonic welding, as appropriate. The necessary welding pressure is applied by way of an anvil 5. The contact plates 2 are fed from a storage container onto the surface of the paint layer 3 by way of a feed chute (not shown).

I claim:

1. A method of producing an electrical contact element having at least one contact piece bonded to a carrier, said method comprising placing an intermediate layer of grinding powder between the contact piece and the carrier, and joining the contact piece and the carrier by sonic or ultrasonic welding.

2. A method according to claim 1 wherein the thickness of the intermediate layer is substantially equal to the size of the individual powder particles.

3. A method according to claim 1 wherein the thickness of the intermediate layer is less than 10µm.

4. A method according to claim 1 wherein the powder particles of the intermediate layer are mixed in a binder and are applied as a paint.

* * * * *